(12) United States Patent
Boss et al.

(10) Patent No.: US 9,098,820 B2
(45) Date of Patent: Aug. 4, 2015

(54) CONSERVATION MODELING ENGINE FRAMEWORK

(75) Inventors: Gregory J. Boss, American Fork, UT (US); Alfred J. Brignull, Essex Junction, VT (US); Michele Palladino Brignull, Essex Junction, VT (US); Rick A. Hamilton, II, Charlottesville, VA (US); Ruthie D. Lyle, Durham, NC (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 1231 days.

(21) Appl. No.: 12/390,780

(22) Filed: Feb. 23, 2009

(65) Prior Publication Data

US 2010/0217631 A1   Aug. 26, 2010

(51) Int. Cl.
  *G06Q 10/00* (2012.01)
  *G06Q 20/00* (2012.01)
  *G06Q 10/06* (2012.01)

(52) U.S. Cl.
  CPC .......... *G06Q 10/06375* (2013.01); *G06Q 10/06* (2013.01); *G06Q 10/06312* (2013.01); *G06Q 10/06313* (2013.01)

(58) Field of Classification Search
  CPC .......... G06Q 10/06375; G06Q 10/067; G06Q 10/0639; G06Q 10/00; G06Q 10/10; G06Q 50/06; G06Q 10/063; G06Q 10/06315; G06Q 10/06393
  USPC ................................................ 705/7.37, 412
  See application file for complete search history.

(56) References Cited

U.S. PATENT DOCUMENTS

| 5,566,084 | A  | * | 10/1996 | Cmar ........................... 700/276 |
| 6,088,688 | A  | * | 7/2000  | Crooks et al. ................ 705/412 |
| 6,122,603 | A  | * | 9/2000  | Budike, Jr. .................... 702/182 |
| 6,366,889 | B1 | * | 4/2002  | Zaloom ........................ 705/7.37 |
| 6,577,962 | B1 | * | 6/2003  | Afshari ......................... 702/61 |

(Continued)

OTHER PUBLICATIONS

Comparison of Field Performance of Multiple Soil Moisture Sensors in a Semi-Arid Rangeland1 Ginger B Paige, Timothy O Keefer. Journal of the American Water Resources Association. Middleburg: Feb. 2008. vol. 44, Iss. 1; p. 121, 15 pgs.*
Novel institutional approaches for conservation of biodiversity and ecosystem services by Goldman, Rebecca Lucille, Ph.D., Stanford University, 2008, 170 pages; AAT 3313578.*
Collecting and monitoring on-farm water data using satellite data collection technology in the Arkansas Delta Dennis K Carman. Journal of Soil and Water Conservation. Ankeny: Jan./Feb. 2008. vol. 63, Iss. 1; p. 16A (3 pages).*

(Continued)

*Primary Examiner* — Justin M Pats
*Assistant Examiner* — Octavian Rotaru
(74) *Attorney, Agent, or Firm* — Patrick J. Daugherty; Driggs, Hogg, Daugherty & Del Zoppo Co., LPA

(57) ABSTRACT

Methods, including service methods, articles of manufacture, systems, articles and programmable devices provide a conservation modeling engine framework. Programmable conservation modeling engines in communication with different customizable resource conservation modules, each resource conservation module customized to a distinct resource, select one of the modules customized to a resource identified for conservation, and user-defined criteria as a function of the identified resource and the selected module. Input data is selected and collected as a function of the resource identified and the selected module and used to weight the input data. Different optimized conservation plans are created as a function of the weighted input data and the selected module, each of the optimized conservation plans displayed having a different implementation cost, a different time for implementation and a different total amount of the identified resource saved.

22 Claims, 4 Drawing Sheets

| 162 — Plan Objective | 174 — Most Water Conserved | 176 — Fastest Time to Implement | 178 — Least Cost to Implement |
|---|---|---|---|
| 164 — Week 1 | Route: A1, C3, B2... | Route: A1, C3, B3... | Route: C1, A3, B4... |
| 166 — Week 2 | Route: A4, B3, C3... | Route: A4, B3, C4... | Route: C3, A2, B5... |
| 168 — Costs | US$240,000 | US$210,000 | US$180,000 |
| 170 — Resources Conserved | 2,500 g.p.d. | 2,100 g.p.d. | 1,100 g.p.d. |
| 172 — Time for ROI | 12 months | 15 months | 8 months |

160

(56) References Cited

U.S. PATENT DOCUMENTS

| | | | | |
|---|---|---|---|---|
| 6,701,298 B1* | 3/2004 | Jutsen | 705/7.39 |
| 6,775,595 B1* | 8/2004 | Yabutani et al. | 700/291 |
| 6,785,592 B1* | 8/2004 | Smith et al. | 700/291 |
| 6,988,024 B2* | 1/2006 | Funakura et al. | 700/288 |
| 7,031,927 B1* | 4/2006 | Beck et al. | 705/7.24 |
| 7,069,161 B2* | 6/2006 | Gristina et al. | 702/61 |
| 7,076,339 B2* | 7/2006 | Yabutani et al. | 700/291 |
| 7,130,832 B2* | 10/2006 | Bannai et al. | 705/412 |
| 7,149,727 B1* | 12/2006 | Nicholls et al. | 705/412 |
| 7,219,069 B2* | 5/2007 | Fouquet | 705/7.22 |
| 7,222,111 B1* | 5/2007 | Budike, Jr. | 705/412 |
| 7,225,089 B2* | 5/2007 | Culp et al. | 702/61 |
| 7,243,044 B2* | 7/2007 | McCalla | 702/182 |
| 7,788,189 B2* | 8/2010 | Budike, Jr. | 705/400 |
| 8,176,095 B2* | 5/2012 | Murray et al. | 707/805 |
| 2002/0087234 A1* | 7/2002 | Lof et al. | 700/286 |
| 2002/0178047 A1* | 11/2002 | Or et al. | 705/10 |
| 2002/0198629 A1* | 12/2002 | Ellis | 700/286 |
| 2003/0023467 A1* | 1/2003 | Moldovan | 705/7 |
| 2003/0033180 A1* | 2/2003 | Shekar et al. | 705/7 |
| 2003/0110116 A1* | 6/2003 | Inubushi | 705/36 |
| 2004/0039621 A1* | 2/2004 | Wood et al. | 705/7 |
| 2004/0044476 A1* | 3/2004 | Miyamoto et al. | 702/2 |
| 2004/0059691 A1* | 3/2004 | Higgins | 705/412 |
| 2005/0246190 A1* | 11/2005 | Sandor et al. | 705/1 |
| 2006/0004616 A1* | 1/2006 | Yamashita et al. | 705/7 |
| 2006/0015424 A1* | 1/2006 | Esposito et al. | 705/35 |
| 2006/0085152 A1* | 4/2006 | Sugiyama et al. | 702/81 |
| 2006/0085363 A1* | 4/2006 | Cheng et al. | 705/400 |
| 2007/0094043 A1* | 4/2007 | Bannai et al. | 705/1 |
| 2007/0143045 A1* | 6/2007 | MacGregor | 702/61 |
| 2007/0255457 A1* | 11/2007 | Whitcomb et al. | 700/273 |
| 2008/0147465 A1* | 6/2008 | Raines et al. | 705/7 |
| 2008/0208654 A1* | 8/2008 | Nahikian et al. | 705/7 |
| 2008/0235067 A1* | 9/2008 | George | 705/7 |
| 2008/0306985 A1* | 12/2008 | Murray et al. | 707/102 |
| 2009/0099887 A1* | 4/2009 | Sklar et al. | 705/7 |
| 2009/0204916 A1* | 8/2009 | Benedek et al. | 715/764 |
| 2009/0281886 A1* | 11/2009 | Castelli et al. | 705/14.17 |
| 2011/0023045 A1* | 1/2011 | Yates et al. | 718/104 |

OTHER PUBLICATIONS

Cases in WaterConservation; United States Environmental Protection Agency;Office of Water (4204M) EPA832-B-02-003 Jul. 2002 www.epa.gov/owm/water-efficiency/index.htm.*

Capital cost definition, Business Dictionary, archives org Jan. 31 2008 https://web.archive.org/web/20080131152741/http://www.businessdictionary.com/definition/capital-cost.html.*

Micro Hydro Power—Pros and Cons, Alternative Energy website, way back machine, Jan. 7, 2008 https://web.archive.org/web/20070108125004/http://www.alternative-energy-news.info/micro-hydro-power-pros-and-cons/.*

Gerbens-Leenes, The water footprint of energy from biomass, Aug. 21 2008 http://www.waterfootprint.org/Reports/Gerbens-Hoekstra-VanderMeer-2008-waterfootprint-bioenergy.pdf.*

Dutra et al, Incentive policies for promoting wind power production in Brazil, Science Direct, Mar. 27, 2007 http://www.sciencedirect.com/science/article/pii/S0960148107000286.*

Haralambopoulos et al, Renewable energy projects structuring a multi-criteria group decision-making framework, Renewable Energy 28, 961-973, Jun. 2002 http://www.sciencedirect.com/science/article/pii/S0960148102000721.*

Ruegg. et al., Life-Cycle Costing. A Guide for Selecting Energy Conservation Projects for Public Buildings, National Engineering Lab. (NBS), Building Economics and Regulatory Technology Div., Sponsor: DOE, Washington, DC. Office of Conservation and Solar Applications, NBS-BSS-113, Sep. 78, 84p.

Beasley, et al., Development of a methodology for baselining the energy use of large multi-building central plants ASHRAE (American Society of Heating, Refrigerating and Air-Conditioning Engineers) Transactions , v 108, n 1 p. 251-259, 2002.

Constant, P., Identification of optimal strategies for building retrofit with unknown future energy costs, IECEC '83 Proceedings of the Eighteenth Intersociety Energy Conversion Engineering Conference, Orlando,FL, Aug. 21-26, 1983. vol. 5—Energy conservation.

Soebarto, Development of a Calibration Methodology for Hourly Building Energy Simulation Models using Disaggregated Energy Use Data from Existing Buildings, vol. 5708A of Dissertations Abstracts International, p. 3296.

* cited by examiner

| Plan Objective | Most Water Conserved | Fastest Time to Implement | Least Cost to Implement |
|---|---|---|---|
| Week 1 | Route: A1, C3, B2… | Route: A1, C3, B3… | Route: C1, A3, B4… |
| Week 2 | Route: A4, B3, C3… | Route: A4, B3, C4… | Route: C3, A2, B5… |
| Costs | US$240,000 | US$210,000 | US$180,000 |
| Resources Conserved | 2,500 g.p.d. | 2,100 g.p.d. | 1,100 g.p.d. |
| Time for ROI | 12 months | 15 months | 8 months |

CONSERVATION MODELING ENGINE FRAMEWORK

FIELD OF THE INVENTION

The present invention generally describes conservation modeling engine tools for planning enterprise-wide conservation initiatives.

BACKGROUND OF THE INVENTION

Conservation plans are useful in the management of enterprise resources. For example, with respect to an agricultural business, a soil conservationist may evaluate a property's soil, water, air, plant and animal resources and write a plan that proposes actions addressing resource management and conditions. Clients generally prefer options, and thus it is preferred that alternative actions are offered within a given plan, which provides more flexibility to clients in creating budgets and installation schedules for deploying or upgrading systems in order to conserve or to more efficiently utilize resources.

Creation, selection and deployment of conservation plans generally involves system or resource specialists using tacit information and manual calculations, and thus the plans written and choices made are highly dependent upon skill sets and knowledge specific and personal to the specialists involved. Moreover, conservation efforts may require accommodating multiple goals, objectives and preferences, some of which may conflict in creating a given plan. Thus, the presence of multiple issues and considerations may cause prior art conservation plans to fail to meet the needs of a client.

SUMMARY OF THE INVENTION

Methods provide programmable conservation modeling engines in communication with different customizable resource conservation modules, each resource conservation module customized to a distinct resource. The programmable conservation modeling engines are configured by logic components to select one of the customizable resource conservation modules customized to a resource identified for conservation and to select user-defined criteria as a function of the resource identified for conservation and the selected conservation module. Input data is selected and collected as a function of the resource identified for conservation and the selected customizable resource conservation module and used by the programmable conservation modeling engines to weight the selected and collected input data as a function of the selected user-defined criteria. Different optimized conservation plans are created as a function of the weighted input data and the selected customizable resource conservation module, each of the optimized conservation plans having a different implementation cost, a different time for implementation and a different total amount of the identified resource saved, and optimized conservation plans are displayed by distinguishing relative different implementation costs, different times for implementation and different total amounts of the identified resource saved.

Service methods are also provided comprising deploying programmable conservation modeling engine frameworks or logic components to configure programmable conservation modeling engines according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for a programmable conservation modeling engine framework. Moreover, systems, articles and programmable devices are also provided, configured for performing one or more method and/or process elements of the current invention for providing a programmable conservation modeling engine framework, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

Figure 1:
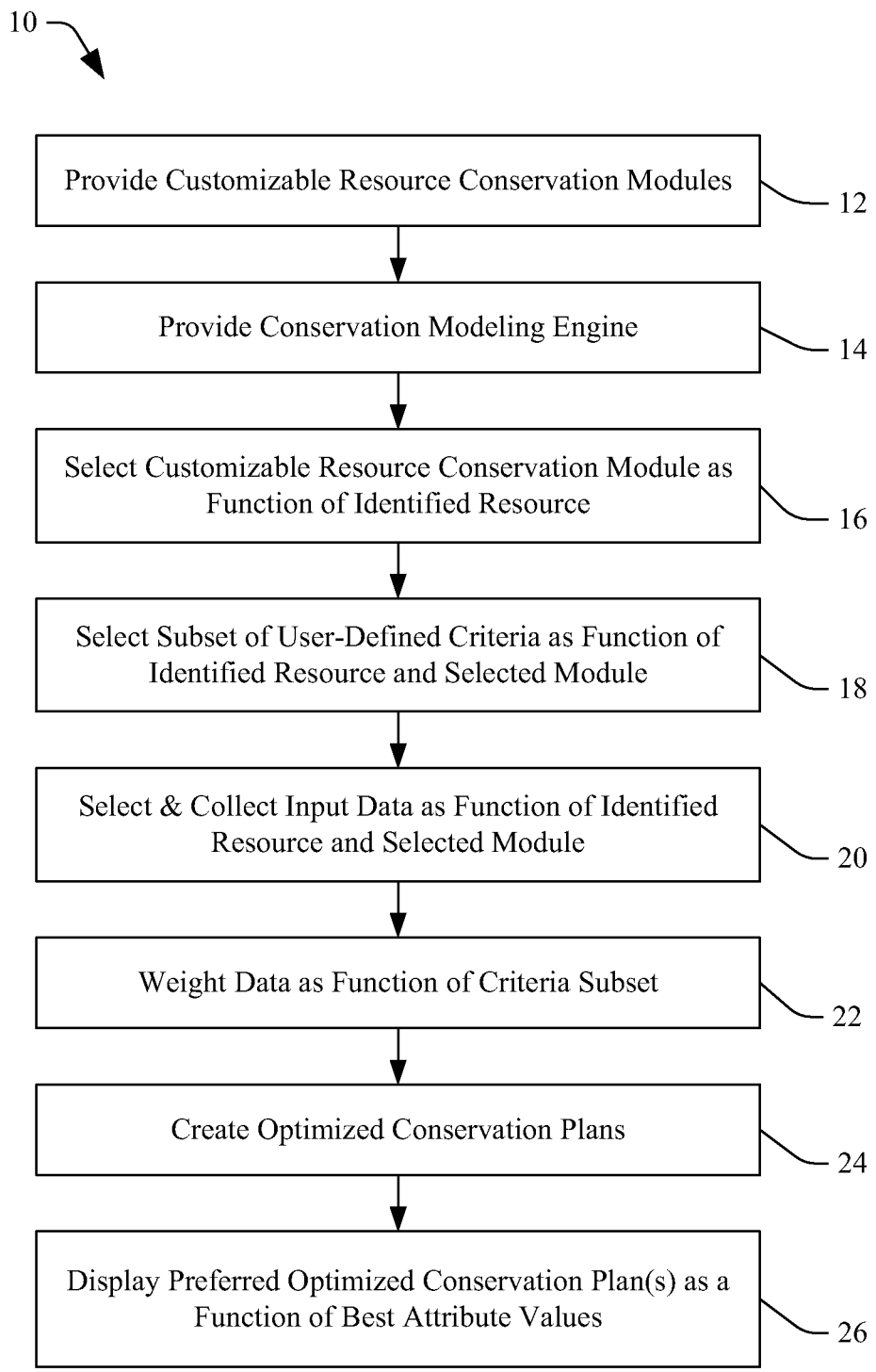
FIG. 1 is a diagrammatic illustration of a method, process or system for providing a conservation modeling engine framework according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description; and
II. Computerized Implementation.

I. General Description

Conservation initiatives deployed to save resources (e.g. water, electricity, etc.) in areas with shortages require the consideration of a plurality of objectives, costs and party interests. Decisions made on an enterprise level are complex, and lack of adequate or sophisticated planning may result in deployment plans inappropriate to some important objectives.

FIG. 1 illustrates a method, process or system for providing a conservation modeling engine framework 10 according to the present invention. At 12 a plurality of different customizable resource conservation modules is provided, each of the different customizable resource conservation modules customized to a distinct resource (e.g. water, natural gas, electricity, carbon emissions, etc.). At 14 a programmable conservation modeling engine is provided in communication with the customizable resource conservation modules, wherein the programmable conservation modeling engine is configured by one or more logic components.

As configured, at 16 the conservation modeling engine selects one of the customizable resource conservation modules customized to a resource identified for conservation, at 18 selects user-defined criteria as a function of the resource identified for conservation and the selected customizable resource conservation module, and at 20 selects and collects input data as a function of the resource identified for conservation and the selected customizable resource conservation module. At 22 the conservation modeling engine weights the selected and collected input data as a function of the selected user-defined criteria and at 24 creates different optimized conservation plans as a function of the weighted input data and the selected customizable resource conservation module.

Each of the optimized conservation plans has different attributes used to distinguish the plans and thereby select one or more plans, including divergent implementation costs, times for implementation and total amounts of the identified resource saved, as well as other attributes.

At 26 the conservation modeling engine displays the best optimized conservation plans with respect to different relative attributes, such as implementation costs, different times for implementation and different total amounts of the identified resource saved, etc. In some embodiments the display at 26 may comprise recommending each of a subset group of optimized plans as a function of each having a most preferred (e.g. highest or lowest or best) value of a total executing cost, a total amount of resources saved, a period of time for executing the plan, best return on investment, etc., relative to the other optimized conservation plans. Thus, one embodiment may show and/or recommend a lowest cost plan, another that saves the most resources, and another that may be implemented the fastest.

Figure 2:
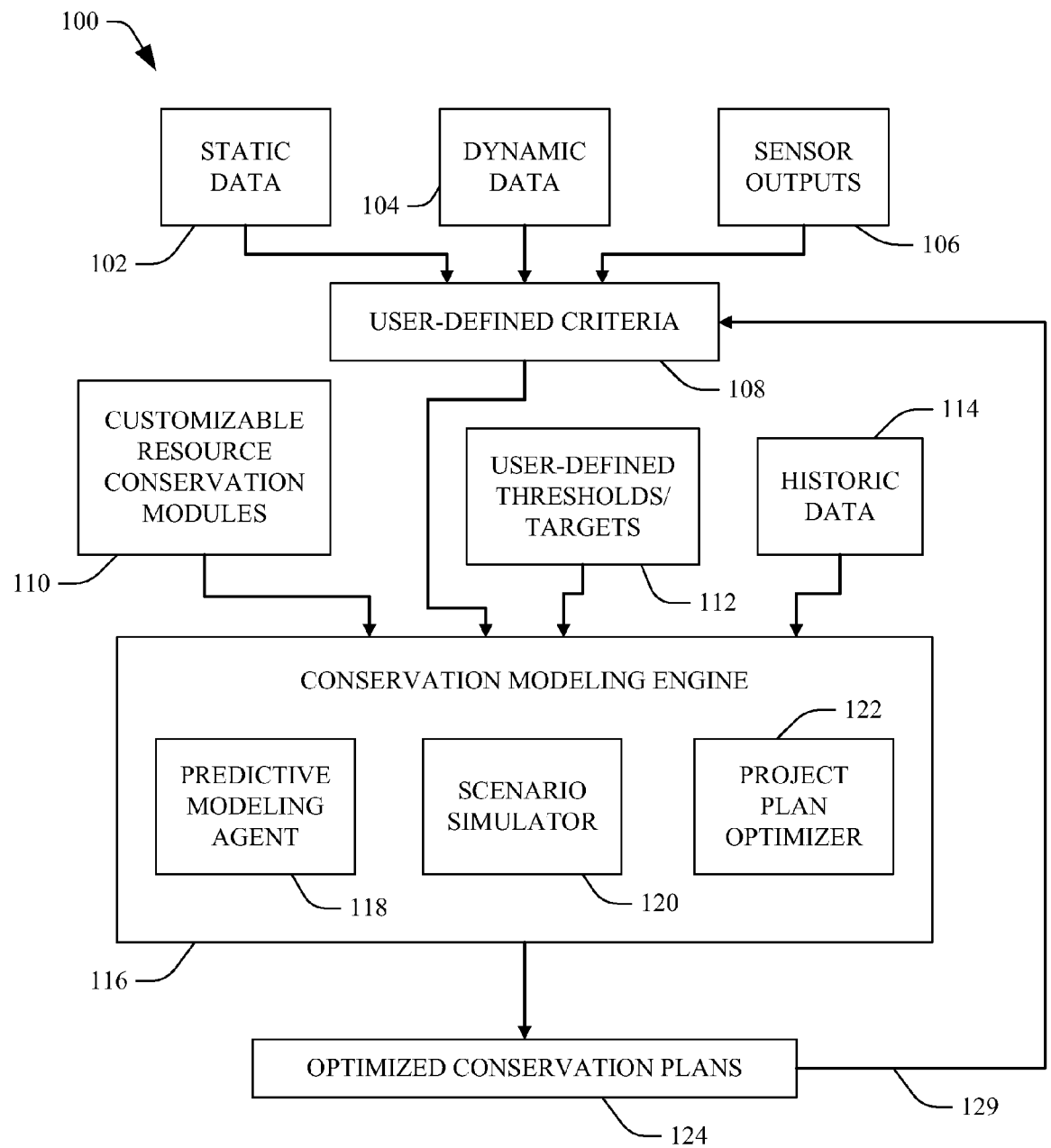
FIG. 2 illustrates a conservation modeling engine framework according to the present invention.

FIG. 2 illustrates a conservation modeling engine framework 100 according to the present invention. Static input data 102 includes fixed or generally non-variable enterprise project resources, for example the number of buildings under management or use, numbers of types of water faucets in the buildings and resource usage, maintenance and upgrade budgets (for example, relative to faucets, energy costs for hot water faucets, water provider bills for water usage, upgrade budget, etc.), and still other static data 102 useful according to the present invention may be apparent to one skilled in the art.

Dynamic input data 104 includes variable data inputs dynamically derived from the latest data available etc. Illustrative but not exhaustive examples include dynamic weather service feeds (for example, drought or heighten-fire risk conditions predicted to occur or continue over a given future time period); commodities reports; population statistics; traffic conditions (for example, local freeway construction impacting traffic flows, resulting in predicted lower miles-per-gallon performance for company and commuter vehicles and/or increased use of mass transit options, etc.); and current regional or extra-regional energy usage, demands availability or costs. Thus, with respect to a water management plan, dynamic inputs 104 may include weather, expected water shortage changes, expected water price increase, and expected growth of an area covered by a water source. Still other dynamic data 104 useful according to the present invention may be apparent to one skilled in the art.

Real-time resource information may also be provided by sensor outputs 106, for example water level observations provided by reservoir and well detectors; metered real-time water flow from each faucet; real-time traffic patterns; current electrical energy usage on a given grid; current market pricing for natural gas; current carbon gas emissions at given locations or regions; and still other sensor outputs 106 useful according to the present invention may be apparent to one skilled in the art.

As discussed above, Customizable Resource Conservation Modules 110 are selected and incorporated into the Conservation Modeling Engine 116 for use as a function of identified resource(s) of concern, and static data 102, dynamic data 104 and sensor outputs 106 are weighted through user-defined criteria 108 selected and relevant to the resource(s) of concern and a selected Module 110. User-defined criteria 108 include weightings, priorities, thresholds, including maximum budget available, amount of resource that must be saved, and still other criteria useful according to the present invention may be apparent to one skilled in the art.

The present invention provides for the use of different Resource Conservation Modules 110 for different resources as well as for different conservation models, enabling a highly customizable system that applies to different domain areas wherein users do not have to modify application code to reapply the framework 100 to different domains. Resource Conservation Modules 110 include user input data, dependencies and rules components specific to given identified resource or resources and may be represented as extensible mark-up language (XML) files, data objects or as other data files.

User-defined thresholds and targets 112 are also provided to the Conservation Modeling Engine 116, and in some cases incorporated into the selected and incorporated Customizable Resource Conservation Module 110 (as is more fully discussed below). The user-defined thresholds and targets 112 may comprise maximum time and materials costs, or maximum time for completion of a conservation plan project, as specified by a budget or an authorizing or managing entity, and still other thresholds and targets 112 useful according to the present invention may be apparent to one skilled in the art. Historic data 114 is also provided to the Conservation Modeling Engine 116, and also in some cases incorporated into a selected and incorporated Customizable Resource Conservation Module 110: illustrative but not exhaustive examples include historic weather patterns for a relevant region, time of year (e.g. average rainfall of recent, current and future time periods), average water usage per day for the present time period (e.g. usual summer usage relevant to landscape maintenance), and still other historic data 114 useful according to the present invention may be apparent to one skilled in the art.

The Conservation Modeling Engine 116 is thus enabled to create and output a plurality of optimized conservation plans 124. The optimized conservation plans 124 may be presented for selection and implementation by a user entity, or they may be automatically selected and implemented by the Conservation Modeling Engine 116. Attributes of the optimized conservation plans 124 are also used as feedback 129 to the user-defined criteria 108 component, in one aspect to change user-defined targets, thresholds, inputs and weights used to weight the static data 102, dynamic data 104 and sensor outputs 106 as discussed above.

Figures 3, 4:
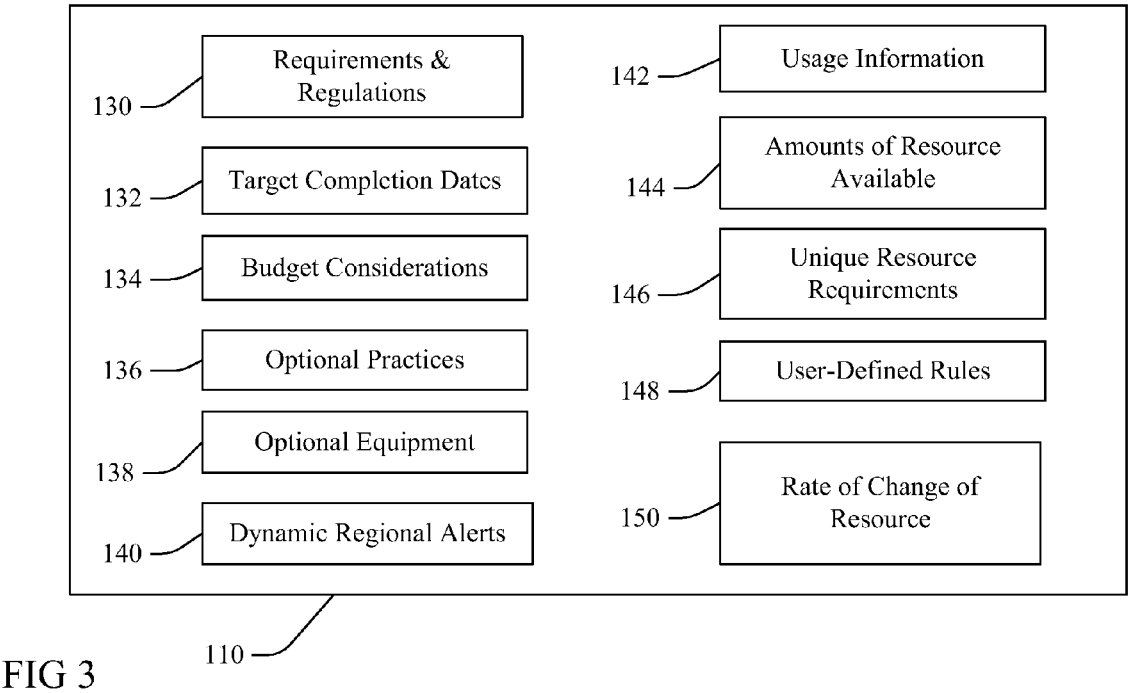
FIG. 3 is a block diagram of a Resource Conservation Module according to the present invention.
FIG. 4 is a tabular diagram illustrating a display of differentiated optimized plans by a conservation modeling engine framework according to the present invention.

FIG. 3 provides a block diagram illustration of a Resource Conservation Module 110 according to the present invention comprising a plurality of components 130-150. Some of the components 130-150 are specific to a resource of concern, and thus differ between different modules drawn to different resources of concern. For purposes of illustration, each of the components 130-150 are described presently below for different module 110 embodiments drawn to one each of water, electricity, natural gas and carbon emissions resources, though it will be appreciated that other resources and models may be practiced (e.g. gasoline, diesel, hybrid, hydrogen, biofuel use and distribution, vehicular selection and deployment, etc.)

The Requirements & Regulations component 130 incorporates requirements from governmental or other regulating and certifying bodies specific: examples include mandates for low-flow devices and time-dependent bans on watering lawns (e.g. "Monday through Friday") in a water module 110; peak hours consumption limits (e.g. for heating and cooling) and building insulation requirements in an electricity module 110; energy usage constraints and loss restrictions in a natural gas module 110; and operation time restrictions, requirements for carbon trading and/or exchange participation, and pollution control requirements and restrictions, in some embodiments industry or application-dependent, for a carbon emissions module 110.

A target completion date component 132 may also be provided, in some example specifying a plurality of phased completion dates for implementation (e.g. "complete Phase 1 by end of second quarter, and Phase 2 by end of fourth quarter"). A Budget considerations component 134 incorporates resource or plan-specific limits and parameters: in a water module 110 example a municipal bond limit of forty million dollars (US$40M) and fiscal milestones, some limited to non-crisis mode upgrades applications; in contrast, a Power Grid upgrade project budget limit of one hundred million dollars (US$100M) is provided by an electricity module 110 example, a cost of unit conversions and costs and availability of alternatives is provided by a natural gas module 110 and costs and availability of unit conversions, alternatives, carbon emissions equity trading and capability monitoring are provided by a carbon emissions module 110.

An Optional Practices component 136 may incorporate rolling shortages and permanent changes capabilities as well as peak hour limitations, and construction limitations in the water module 110; rationing, on/off peak penalties/rewards (e.g. energy credits), and brownout or blackout capabilities may be considered in the electricity module 110; facility rationing capabilities and requirements for use and/or availability of alternatives may be considered in the natural gas module 110; and shut down and/or line down requirements, facility and/or community requirements, and use of trading partners may be considered in the carbon emissions module 110.

The Optional Equipment component 138 may consider and compare the performance of different flow devices in meeting full, medium and/or low-flow standards in the water module 110; lower wattage fixtures or appliances and supplemental sources (e.g. wind, solar energy sources) may be considered in the electricity module 110; and high-efficiency units and hybrid units may be identified and considered in the natural gas module 110 and/or the carbon emissions module 110, which may also consider emission control and filtration devices. Dynamic regional Alerts 140 (e.g. from dynamic data feeds 104 of FIG. 2) may be directly incorporated into the Resource Conservation Module 110, for example drought, fire or high-ultra violet (UV) index warnings may be considered in the water module 110; brown out condition or peak usage alerts may be considered in the electricity module 110; shortages and local price spikes may be considered in the natural gas module 110; and pollution indexes may be considered in the carbon emissions module 110.

The Usage Information component 142 may incorporate data from the dynamic data 104, sensor outputs 106, historic data 114 and other sources. Thus, peak water usage times, members per household, gallons used per member and average community usage may be considered in the water module 110; peak electricity usage times; members per household, kilowatt-hours usage per household member, and high-use and critical use identification parameters may be considered in the electricity module 110; cubic feet consumption per household, members per household, high-use and critical use identification and peak time parameters may be considered in the natural gas module 110; and cubic feet generation or consumption per household, members per household, high-use and critical use identification parameters, and peak time parameters may be considered in the carbon emissions module 110.

The Amounts of Resource Available component 144 may incorporate data from the dynamic data 104, sensor outputs 106, historic data 114 and other sources: thus reservoir levels (e.g. as obtained from the sensor outputs 106), number of and capacity of available water wells and average well depth may be considered in the water module 110; grid capacity may be considered in the electricity module 110; market availability and on-site resource amounts or capacity may be considered in the natural gas module 110; and carbon-emitting practices, locations, equipment, and monitoring capability may be considered in the carbon emissions module 110.

The Unique Resource Requirements component 146 considers the physical properties of the resources with respect to utilization, storage, etc. Thus, in a water module 110 purity and contaminant targets, limits or densities must be met, or some physical plants and components may require environmental and operational temperatures above freezing temperatures (e.g. sensor outputs 106 must indicate temperatures above 33 degrees Fahrenheit during implementation of an upgrade, perhaps requiring delay of an upgrade phase until after May 15th in some northern hemisphere locations); battery storage, output, insulation and minimum separation distance requirements may be considered in the electricity module 110; and safety requirements, temperature requirements, purity and contaminant requirements and storage practices may be considered in the natural gas module 110 and the carbon emissions module 110, which may also consider emission concentration, other pollutant presence and contributors and storage and exchange practices.

User defined rules 148, including priorities, allowable combinations, and thresholds and required degrees of adherence to regulations and rules and defined weightings, may be incorporated into the module 110 from the user-defined criteria 108, the user-defined thresholds and targets 112 and from other sources, in some embodiments as provided or further refined and revised through feedback 129 to the user-defined criteria 108 from the optimized conservation plans 124 produced by the Conservation Modeling Engine 116. A Rate of Change of a Resource 150 may also be observed and considered, in some examples as provided by the sensor outputs 106 and dynamic data feeds 104 in view of static data 102 and historic data 14 inputs. Thus, a rate-of-change in resource availability or use may be derived from average household usage, current supply availability and current/predicted/historic weather conditions in the water module 110, the electricity module 110 and the natural gas module 110; and emissions by location (e.g. "hot spots") may be considered in the carbon emissions module 110.

Referring again to FIG. 2, the Conservation Modeling Engine 116 is configured to select an appropriate module 110 in response to an identified resource and utilize Predictive Modeling Agent 118, Scenario Simulator 120 and Project Plan Optimizer 122 components to perform modeling, create scenarios of possible implementation plans and display a plurality of resultant optimized plans each differentiated by specific result parameters. The Predictive Modeling Agent 118 and Scenario Simulator 120 use predictive methods to predict what value a certain input variable may have at a time of plan execution; for example they may predict a future severity of a resource shortage. Some embodiments may utilize Monte Carlo methodology, which solves a problem by generating suitable random numbers and observing that fraction of the numbers obeying some property or properties; this type of method is useful for obtaining numerical solutions to problems considered too complicated to solve analytically.

Prior art decision systems often operate in two basic methods, wherein inputs are set and may not be modified, and the decision system determines resulting outputs; and wherein inputs are set but may be modified to achieve desired output. In contrast, the Predictive Modeling Agent 118 of the present invention provides a hybrid decision entity, wherein the Conservation Modeling Engine 116 may modify both inputs 102, 104, 106, 108, 112 and 114 and optimized conservation plan outputs 124 to meet thresholds set at each end and thereby determine the best optimized plan at 124. More particularly, feedback 129 to the user-defined criteria input 108 enables calculation of plans and values by modifying both inputs and outputs.

The Project Plan Optimizer 122 uses one or more optimization algorithms to address optimization problems, providing computational solutions to a problem in which the object is to find the best of all possible solutions. More formally, it finds a solution in a feasible region which meets a minimum or maximum value of an objective function, and may recommend plans or solutions at 124 based on a most efficient use of combined available resources and weighted inputs, priorities and/or parameters (e.g., response to time, energy, money, space, etc.), which may also be presented, represented or analyzed on a return-on-investment (ROI) basis.

Illustrative but not exhaustive examples of optimization algorithms that may be used by the Project Plan Optimizer 122 include: a "Greedy Algorithm," one that that follows a problem-solving metaheuristic of making a locally optimum choice at each stage, with the objective of finding a global optimum result; a "Penalty Method," which replaces an original constraint optimization problem with a series of unconstrained problems, wherein the individual problem solutions must converge to a solution of the original constrained problem; and a "Cooperative Optimization," which is a general optimization method incorporating a cooperation principle in attacking difficult optimization problems. Embodiments of the Project Plan Optimizer 122 utilizing Cooperative Optimization algorithmic processes may solve real-world optimization problems encompassing millions of variables while meeting high performance and speed standards.

In one example implementation, a facility manager desires to reduce water usage, for example in response to a government or enterprise entity mandate resulting from a current or projected water supply shortage. In order to generate an efficient facilities upgrade plan in compliance with the mandate, the facility manager identifies the resource of concern as "water" to the Conservation Modeling Engine 116, which responsively selects a Water Resource Conservation Module 110 from a plurality of available resource modules 110. The facility manager further provides specific inputs, dependencies and rules for possible water conservation scenarios as user-defined criteria 108 or thresholds/targets 112 to the Conservation Modeling Engine 116, for example including minimum requirements to meet availability expectations (e.g., pipes cannot run dry, temperatures must remain above freezing, etc.).

Water resource-related static inputs 102 are provided to or retrieved by the Conservation Modeling Engine 116, including number of buildings and locations, proximity to each other, number of facility items at each location (e.g., faucets, washing machines, toilets, etc.). Water resource-related Dynamic inputs 104 are also provided to or retrieved by the Conservation Modeling Engine 116, including traffic patterns for each facility and facility item, number of people available to perform upgrades, estimated time of an item upgrade, costs to upgrade per facility item, time and costs to move upgrade crews between facilities, etc.

The Conservation Modeling Engine 116 utilizes predictive methods through the Predictive Modeling Agent 118, Scenario Simulator 120 and Project Plan Optimizer 122 components as discussed above, which incorporate and consider expected weather conditions, increased or reduced demands and availability due to holidays and/or special events in the community, predicted future drought severity, governmental energy and/or water conservation incentives, risks, possible political actions, etc., from the data inputs 102, 104 and 106 and past experience 114 to produce three different optimized plans 174, 176 and 178 illustrated in FIG. 4 which created and displayed differentiated with respect to differentiated relative main objectives 162 as well as other attributes 164-172.

More particularly, the table 160 of FIG. 4 presents the optimized plans 174, 176 and 178 by indicating their differentiated relative main objectives 162: the first plan 174 achieves the highest relative amount of water conserved; the second plan 176 offers the fastest time of implementation; and the third plan 178 offers the lowest implementation cost. Thus, in one aspect, a user may choose (or the Conservation Modeling Engine 116 automatically chooses) one of the plans 174, 176 and 178 in response to a preference or priority; if maximum water conservation is desired or required independent of cost, then the first plan 174 is selected, but if time of implementation is more important than cost, then the second plan 176 should be selected, and if lowest cost is more important than either time or resource savings, the third plan 178 is selected.

The main relative characteristics 162 may also be weighted or prioritized relevant to each other through user-defined criteria 108 or threshold/targets 112 to provide recommendations or automatic selections. In one example, from a total of 100% the priority of relative total cost of a resource conservation action plan is weighted at 60%, the priority of a relative amount of conservation achieved by a plan is weighted at 30%, and the priority of a relative time period to effect a conservation action plan is weighted at 10%: thus since relative total cost has the highest priority, the least costly plan 178 of FIG. 4 would be recommended or automatically selected by the Conservation Modeling Engine 116 over the other plans 174 and 176.

According to the present invention, the attributes 164-172 of each plan 174, 176 and 178 are also displayed in the table 160. Thus, actions to be taken are organized with respect to periods of time, with first "week 1" row 164 and second "week 2" row 166 displaying deployment order in routes "A1, C3 and B2," etc., that may identify buildings, floors, addresses or other location indicia associated with certain faucets for replacement. Costs 168 of executing each plan 174, 176 and 178 in terms of money and resources (e.g. materials costs for new faucets, man-hours, etc.) are provided. Resources saved 170 by executing each plan (e.g. quantified through comparison to the cost of a baseline such as the costs of doing nothing or in executing a current or alternative baseline plan) are provided in gallons-per-day (g.p.d.). Lastly, the duration of time required to achieve a return-on-investment (ROI) 172 equivalent to the costs of implementation is also provided. Thus, in one aspect, any or each of the attributes 164, 166, 168, 170 and 172 may also be used and considered in selecting one of the three plans 174, 176 and 178.

Figure 5:
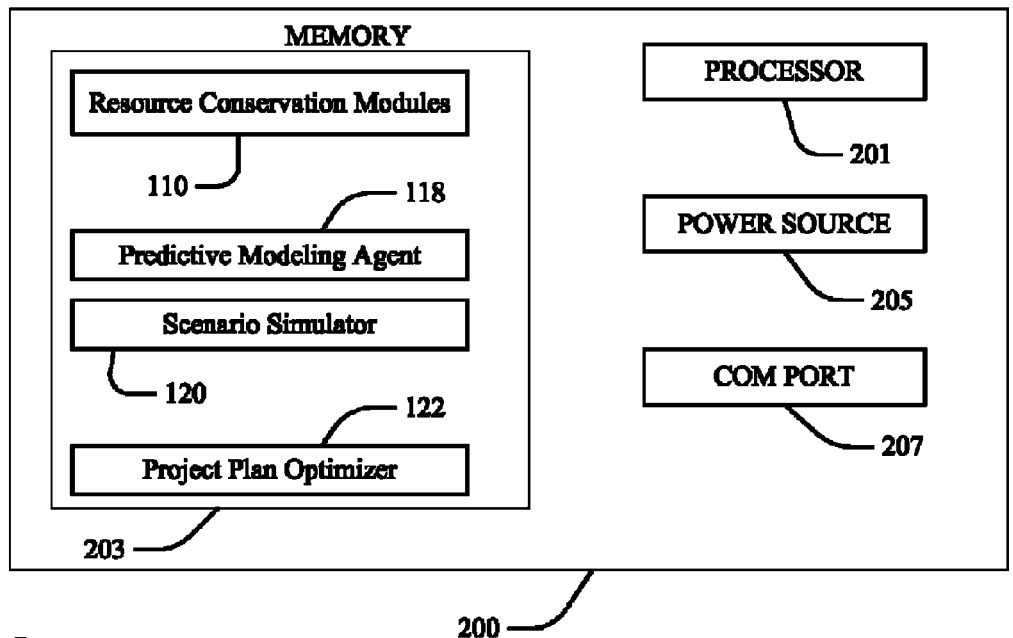
FIG. 5 illustrates a programmable device or module configured to provide a conservation modeling engine framework according to the present invention.

FIG. 5 illustrates a programmable device or module 200 configured to provide a conservation modeling engine framework according to the present invention, for example as illustrated and/or configured to provide the processes and results illustrated in FIGS. 1-4 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment thus comprises a central processing unit (CPU) or other processing means 201 in communication with a memory 203 comprising logic components that enable the CPU 201 to perform processes and methods according to the present application. Thus, the memory 203 comprises Customizable Resource Conservation Modules 110 and a Predictive Modeling Agent 118 logic component, a Scenario Simulator 120 logic component and a Project Plan Optimizer 122 logic component, each having functions and attributes understood through reference to FIGS. 1-4 the associated specification materials above.

A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 6:
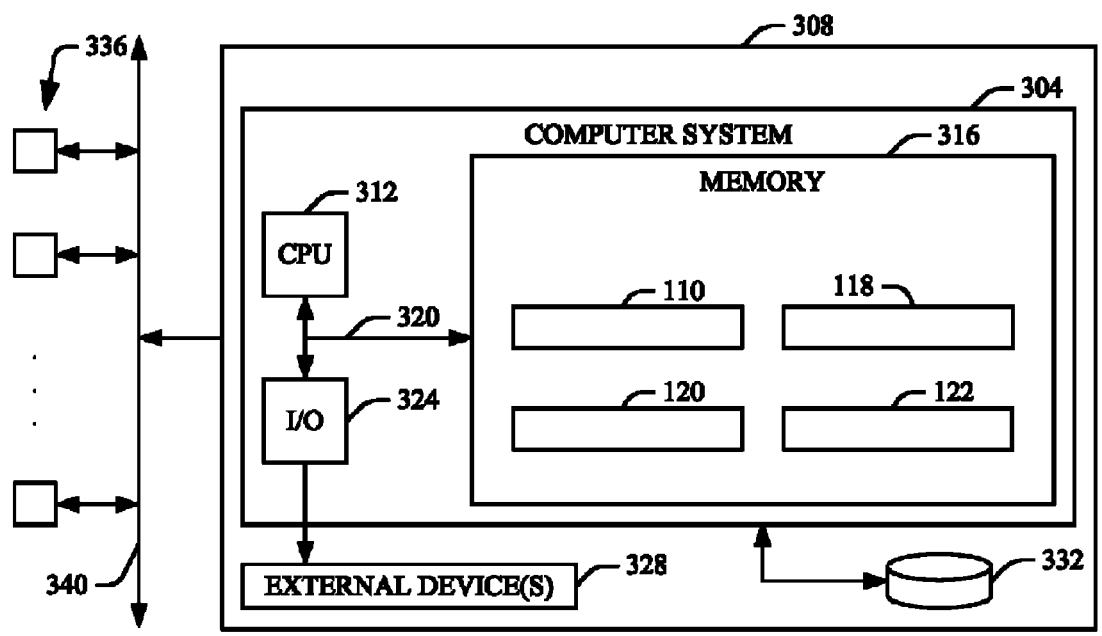
FIG. 6 illustrates an exemplary computerized implementation of a conservation modeling engine framework according to the present invention.

Referring now to FIG. 6, an exemplary computerized implementation of a conservation modeling engine framework according to the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage systems 332. In general, the processing unit 312 executes computer program code, such as the code to implement various components of the process and systems, and devices as illustrated in FIGS. 1-5 and described above, including the Customizable Resource Conservation Modules 110, the Predictive Modeling Agent 118 logic component, the Scenario Simulator 120 logic component and the Project Plan Optimizer 122 logic component, and which are stored in memory 316 and/or storage system 332. It is to be appreciated that two or more, including all, of these components may be implemented as a single component.

While executing computer program code, the processing unit 312 can read and/or write data to/from the memory 316, the storage system 332 (e.g. the, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1 through 4 described above and otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for providing a conservation modeling engine framework, comprising:

selecting, at a conservation modeling engine, a customizable resource conservation module from a provided plurality of different customizable resource conservation modules as a function of the selected module being customized to a resource identified for conservation, wherein the selected module includes requirements unique to the resource identified for conservation, and wherein each of the different customizable resource conservation modules are customized to different ones of a plurality of distinct resources that includes the resource identified for conservation;

determining, at the conservation modeling engine, a rate of change of availability of the resource identified for conservation from:

a real-time sensor input comprising a current level of usage of the resource identified for conservation;

a dynamic data feed comprising at least one of weather conditions, and demands for the resource identified for conservation that are currently predicted to occur over a future time period;

static data comprising a number of facility items using the resource identified for conservation; and historic data comprising at least one of an average usage rate of the resource identified for conservation by the facility items, and a historic weather pattern for a region comprising the facility items;

creating, at the conservation modeling engine, a plurality of different conservation plans for the region for the future time period by applying the selected customizable resource conservation module to inputs of the determined rate of change of availability of the resource, the real-time sensor input, the dynamic data feed, the static data and the historic data, wherein the plurality of conservation plans includes a first plan that has a least implementation cost, a second plan that has a fastest time for implementation and a third plan that conserves a most amount of the resource identified for conservation;

optimizing, by a hardware processor, using one of a greedy algorithm, a penalty method algorithm and a cooperative optimization, the first, second and the third plans by predicting utilizing a Monte Carlo methodology, future values of input variables at an execution time of the first, second and third plans; and based on said predicting, modifying the input variables and the optimized first, second and third plans to meet thresholds set at an end of a feedback workflow.

2. The method of claim 1, further comprising displaying the optimized first, second and third plans in a single table diagram that:

distinguishes different values of implementation costs, times for implementation and total amounts of the resource identified for conservation that are each displayed for each of the displayed plans;

identifies the first plan as having the least implementation cost, the second plan as having the fastest time for implementation, and the third plan as conserving the most amount of the resource identified for conservation; and displays sets of ordered pluralities of different location-specific actions to be taken to implement each of the optimized first, second and third plans and in association with respective ones of the optimized first, second and third plans, wherein each of the sets of ordered pluralities are associated with different ones of the optimized first, second and third plans and comprise different orders of the location-specific actions.

3. The method of claim 2, further comprising:

displaying each of the sets of the ordered pluralities of different location-specific actions in association with time periods for taking the ordered actions, wherein the time periods are subsets of a total time of the time for implementation of an associated plan of the optimized first, second and third plans.

4. The method of claim 3, further comprising:

predicting each of a plurality of values of an input variable at a time of execution of each of the optimized first, second and third plans;

predicting a future severity of a shortage of the resource identified for conservation; and wherein the step of creating the optimized first, second and third plans is further a function of the plurality of predicted values of the input variable and the predicted future shortage severity.

5. The method of claim 4, further comprising:

selecting user-defined criteria as a function of the resource identified for conservation and the selected customizable resource conservation module;

selecting and collecting data as a function of the resource identified for conservation and the selected customizable resource conservation module;

weighting the selected and collected data as a function of the selected user-defined criteria to generate the input data; and modifying thresholds of the selected user-defined criteria in response to feedback from the created plurality of different optimized conservation plans at the end of the feedback workflow.

6. The method of claim 5, further comprising:

calculating and displaying an estimated return-on-investment time period for each of the optimized first, second and third plans as a function of their respective implementation costs; and weighting the first plan, the second plan and the third plan through the user-defined criteria to recommend a plan and a time duration to achieve a return on investment of the recommended plan.

7. The method of claim 6, further comprising the processing unit automatically selecting and implementing a one of the optimized first, second and third plans having the identified lowest time for implementation, the identified highest total amount of the identified resource identified for conservation, or the identified lowest implementation cost, in response to a specified priority.

8. The method of claim 1, further comprising:

integrating computer-readable program code into a computer infrastructure comprising a processor, a computer readable memory and a computer readable storage medium, wherein the computer readable program code is embodied on the computer readable storage medium and comprises instructions that, when executed by the processor via the computer readable memory, cause the processor to perform the steps of selecting the customizable resource conservation module, determining the rate of change of availability of the resource identified for conservation, optimizing the first, second and the third plans and modifying the input variables and the optimized first, second and third plans to meet thresholds sets at the end of the feedback workflow.

9. A system, comprising:

a hardware processor, a computer readable memory and a computer-readable hardware storage device;

wherein the hardware processor, when executing program instructions stored on the computer-readable hardware storage device via the computer readable memory:

selects a customizable resource conservation module from a provided plurality of different customizable resource conservation modules as a function of the selected module being customized to a resource identified for conservation, wherein the selected module includes requirements unique to the resource identified for conservation, and wherein each of the different customizable resource conservation modules are customized to different ones of a plurality of distinct resources that includes the resource identified for conservation;

determines a rate of change of availability of the resource identified for conservation from:

a real-time sensor input comprising a current level of usage of the resource identified for conservation;

a dynamic data feed comprising at least one of weather conditions, and demands for the resource identified for conservation that are currently predicted to occur over a future time period;

static data comprising a number of facility items using the resource identified for conservation; and historic data comprising at least one of an average usage rate of the resource identified for conservation by the facility items, and a historic weather pattern for a region comprising the facility items;

creates a plurality of different conservation plans for the region for the future period time by applying the selected customizable resource conservation module to inputs of the determined rate of change of availability of the resource, the real-time sensor input, the dynamic data feed, the static data and the historic data, wherein the plurality of conservation plans includes a first plan that has a least optimized implementation cost, a second plan that has a fastest time for implementation and a third plan that conserves a most amount of the resource identified for conservation;

optimizes, via one of a greedy algorithm, a penalty method algorithm and a cooperative optimization, the first, second and the third plans by predicting utilizing a Monte Carlo methodology, future values of input variables at an execution time of the first, second and third plans; and based on said predicting, modifies the input variables and the optimized first, second and third plans to meet thresholds sets at an end of a feedback workflow.

10. The system of claim 9, wherein the hardware processor, when executing the program instructions stored on the computer-readable hardware storage device via the computer readable memory, further:

displays the optimized first, second and third plans in a single table diagram that:

distinguishes different values of implementation costs, times for implementation and total amounts of the resource identified for conservation that are each displayed for each of the displayed plans;

identifies the first plan as having the least implementation cost, the second plan as having the fastest time for implementation, and the third plan as conserving the most amount of the resource identified for conservation; and displays sets of ordered pluralities of different location-specific actions to be taken to implement each of the optimized first, second and third plans and in association with respective ones of the optimized first, second and third plans, wherein each of the sets of ordered pluralities are associated with different ones of the optimized first, second and third plans and comprise different orders of the location-specific actions.

11. The system of claim 10, wherein the hardware processor, when executing the program instructions stored on the computer-readable hardware storage device via the computer readable memory, further displays each of the sets of the ordered pluralities of different location-specific actions in the single table in association with time periods for taking the ordered actions, wherein the time periods are subsets of a total time of the time for implementation of an associated plan of the optimized first, second and third plans.

12. The system of claim 11, wherein the hardware processor, when executing the program instructions stored on the computer-readable hardware storage device via the computer readable memory, further:

predicts each of a plurality of values of an input variable at a time of execution of each of the optimized first, second and third plans;

predicts a future severity of a shortage of the resource identified for conservation; and creates the optimized first, second and third plans as a function of the plurality of predicted values of the input variable and the predicted future shortage severity.

13. The system of claim 12, wherein the hardware processor, when executing the program instructions stored on the computer-readable hardware storage device via the computer readable memory, further:

selects user-defined criteria as a function of the resource identified for conservation and the selected customizable resource conservation module;

selects and collects data as a function of the resource identified for conservation and the selected customizable resource conservation module;

weights the selected and collected data as a function of the selected user-defined criteria to generate the input data; and modifies thresholds of the selected user-defined criteria in response to feedback from the created plurality of different optimized conservation plans at the end of the feedback workflow.

14. The system of claim 13, wherein the hardware processor, when executing the program instructions stored on the computer-readable hardware storage device via the computer readable memory, further:

calculates and displays an estimated return-on-investment time period for each of the optimized first, second and third plans as a function of their respective implementation costs; and weights the first plan, the second plan and the third plan through the user-defined criteria to recommend a plan and a time duration to achieve a return on investment of the recommended plan.

15. The system of claim 9, wherein the hardware processor, when executing the program instructions stored on the computer-readable hardware storage device via the computer readable memory, further automatically selects and implements, in response to a specified priority, a one of the optimized first, second and third plans having the identified lowest time for implementation, the identified highest total amount of the resource identified for conservation, or the identified lowest implementation cost, in response to a specified priority.

16. An article of manufacture, comprising:

a computer readable storage hardware device having computer readable program code embodied therewith, the computer readable program code comprising instructions that, when executed by a computer system processor, cause the processor to:

select a customizable resource conservation module from a provided plurality of different customizable resource conservation modules as a function of the selected module being customized to a resource identified for conservation, wherein the selected module includes requirements unique to the resource identified for conservation, and wherein each of the different customizable resource conservation modules are customized to different ones of a plurality of distinct resources that includes the resource identified for conservation;

determine a rate of change of availability of the resource identified for conservation from:

a real-time sensor input comprising a current level of usage or reservoir amount of the resource identified for conservation;

a dynamic data feed comprising at least one of weather conditions, and demands for the resource identified for conservation that are currently predicted to occur over a future time period;

static data comprising a number of facility items using the resource identified for conservation; and historic data comprising at least one of an average usage rate of the resource identified for conservation by the facility items, and a historic weather pattern for a region comprising the facility items;

create a plurality of different conservation plans for the region for the future time period by applying the selected customizable resource conservation module to inputs of the determined rate of change of availability of the resource, the real-time sensor input, the dynamic data feed, the static data and the historic data, wherein the plurality of conservation plans includes a first plan that has a least optimized implementation cost, a second plan that has a fastest time for implementation and a third plan that conserves a most amount of the resource identified for conservation;

optimize, via one of a greedy algorithm, a penalty method algorithm and a cooperative optimization, the first, second and the third plans by predicting utilizing a Monte Carlo methodology, future values of input variables at an execution time of the first, second and third plans; and based on said predicting, modify the input variables and the optimized first, second and third plans to meet thresholds sets at an end of a feedback workflow.

17. The article of manufacture of claim 16, wherein the computer readable program code instructions, when executed by the processor, further cause the processor to:
  display the optimized first, second and third plans in a single table diagram that:
    distinguishes different values of implementation costs, times for implementation and total amounts of the resource identified for conservation that are each displayed for each of the displayed plans;
    identifies the first plan as having the least implementation cost, the second plan as having the fastest time for implementation, and the third plan as conserving the most amount of the resource identified for conservation; and
    displays sets of ordered pluralities of different location-specific actions to be taken to implement each of the optimized first, second and third plans and in association with respective ones of the optimized first, second and third plans, wherein each of the sets of ordered pluralities are associated with different ones of the optimized first, second and third plans and comprise different orders of the location-specific actions.

18. The article of manufacture of claim 17, wherein the computer readable program code instructions, when executed by the processor, further cause the processor to display each of the sets of the ordered pluralities of different location-specific actions in the single table in association with time periods for taking the ordered actions, wherein the time periods are subsets of a total time of the time for implementation of an associated plan of the optimized first, second and third plans.

19. The article of manufacture of claim 18, wherein the computer readable program code instructions, when executed by the processor, further cause the processor to:
  predict each of a plurality of values of an input variable at a time of execution of each of the optimized first, second and third plans;
  predict a future severity of a shortage of the resource identified for conservation; and
  create the optimized first, second and third plans as a function of the plurality of predicted values of the input variable and the predicted future shortage severity.

20. The article of manufacture of claim 19, wherein the computer readable program code instructions, when executed by the processor, further cause the processor to:
  select user-defined criteria as a function of the resource identified for conservation and the selected customizable resource conservation module;
  select and collect data as a function of the resource identified for conservation and the selected customizable resource conservation module;
  weight the selected and collected data as a function of the selected user-defined criteria to generate the input data; and
  modify thresholds of the selected user-defined criteria in response to feedback from the created plurality of different optimized conservation plans at the end of the feedback workflow.

21. The article of manufacture of claim 20, wherein the computer readable program code instructions, when executed by the processor, further cause the processor to:
  calculate and display an estimated return-on-investment time period for each of the optimized first, second and third plans as a function of their respective implementation costs; and
  weight the first plan, the second plan and the third plan through the user-defined criteria to recommend a plan and a time duration to achieve a return on investment of the recommended plan.

22. The article of manufacture of claim 21, wherein the computer readable program code instructions, when executed by the processor, further cause the processor to automatically select and implement, in response to a specified priority, a one of the optimized first, second and third plans having the identified lowest time for implementation, the identified highest total amount of the resource identified for conservation, or the identified lowest implementation cost, in response to a specified priority.

* * * * *